United States Patent
Lim et al.

(10) Patent No.: US 10,501,638 B2
(45) Date of Patent: Dec. 10, 2019

(54) HARD COATING FILM AND IMAGE DISPLAY DEVICE USING THE SAME

(71) Applicant: Dongwoo Fine-Chem Co., Ltd., Iksan-si (KR)

(72) Inventors: Geo San Lim, Seoul (KR); Dong Hwi Kim, Sejong-si (KR); Kwan Wook Song, Pyeongtaek-si (KR)

(73) Assignee: Dongwoo Fine-Chem Co., Ltd., Ikan-si (KR)

( * ) Notice: Subject to any disclaimer, the term of this patent is extended or adjusted under 35 U.S.C. 154(b) by 56 days.

(21) Appl. No.: 15/448,898

(22) Filed: Mar. 3, 2017

(65) Prior Publication Data

US 2017/0253746 A1    Sep. 7, 2017

(30) Foreign Application Priority Data

Mar. 4, 2016 (KR) .................. 10-2016-0026367
Feb. 21, 2017 (KR) .................. 10-2017-0023026

(51) Int. Cl.
*C09D 4/00* (2006.01)
*G02B 1/14* (2015.01)

(52) U.S. Cl.
CPC ................. *C09D 4/00* (2013.01); *G02B 1/14* (2015.01)

(58) Field of Classification Search
None
See application file for complete search history.

(56) References Cited

U.S. PATENT DOCUMENTS

| 2008/0095997 | A1 | 4/2008 | Chiang et al. |
| 2008/0193722 | A1 | 8/2008 | Tanaka |
| 2010/0296169 | A1 | 11/2010 | Mizuno |
| 2011/0159278 | A1 | 6/2011 | Lee et al. |
| 2015/0203711 | A1* | 7/2015 | Kang ............... C08J 5/18 428/209 |
| 2015/0225598 | A1 | 8/2015 | Kang et al. |
| 2015/0252210 | A1 | 9/2015 | Kang et al. |
| 2015/0252212 | A1 | 9/2015 | Kang et al. |
| 2015/0299505 | A1 | 10/2015 | Kang et al. |

FOREIGN PATENT DOCUMENTS

| KR | 10-2011-0078783 | 7/2011 |
| KR | 101234851 B1 | 2/2013 |
| KR | 10-2014-0027022 | 3/2014 |
| KR | 10-1415839 | 7/2014 |
| KR | 101415838 B1 | 7/2014 |
| KR | 10-1470465 | 12/2014 |

OTHER PUBLICATIONS

Final Office Action, U.S. Appl. No. 15/448,407, dated Jan. 25, 2018.
Final Office Action, U.S. Appl. No. 15/448,484, dated Feb. 7, 2018.
English language translation of KR 10-2011-0078783 published Jul. 7, 2011.
English language translation of KR 10-2014-0027022 published Mar. 6, 2014.
English language translation of KR 10-1415839 published Jul. 9, 2014.
English language translation of KR 10-1470465 published Dec. 8, 2014.
Office Action issued in U.S. Appl. No. 15/448,484 dated Sep. 22, 2017.
Office Action issued in U.S. Appl. No. 15/448,407 dated Sep. 22, 2017.
Office Action issued in U.S. Appl. No. 15/449,025 dated Sep. 22, 2017.
U.S. Appl. No. 15/448,407, filed Sep. 7, 2017, Pending.
U.S. Appl. No. 15/448,484, filed Sep. 7, 2017, Pending.
U.S. Appl. No. 15/448,898, filed Sep. 7, 2017, Pending.
U.S. Appl. No. 15/449,025, filed Sep. 7, 2017, Pending.

* cited by examiner

*Primary Examiner* — Sheeba Ahmed
(74) *Attorney, Agent, or Firm* — DLA Piper LLP (US)

(57) ABSTRACT

The present invention relates to a hard coating film, and more particularly, to a hard coating film that includes a high elongation oligomer having an elastic modulus and elongation at break in a specific range on a transparent substrate, and thus can exhibit excellent impact resistance and bending resistance and can minimize the occurrence of a curl caused by cure shrinkage of a hard coating film, and an image display device using the same.

5 Claims, No Drawings

HARD COATING FILM AND IMAGE DISPLAY DEVICE USING THE SAME

CROSS-REFERENCE TO RELATED APPLICATIONS

This application claims priority to and the benefit of Korean Patent Application No. 10-2016-0026367, filed on Mar. 4, 2016, and Korean Patent Application No. 10-2017-0023026, filed on Feb. 21, 2017, the disclosures of which are incorporated herein by reference in their entirety.

FIELD OF THE INVENTION

The present invention relates to a hard coating film having excellent impact resistance and bending resistance, and an image display device using the same.

BACKGROUND

As mobile devices such as smart phones and tablet PCs have been developed in recent years, thinner and slimmer display substrates have been required. Glass or tempered glass as a material having excellent mechanical properties has been generally used for a display window or a front plate of these mobile devices. However, the glass causes a weight of the mobile devices to be heavy due to its own weight, and has a problem of damage due to an external impact.

Therefore, plastic resins are being studied as a substitute for glass. A plastic resin composition is appropriate for the trend of pursuing a lighter mobile device because it is lightweight and is less likely to be broken. In particular, a composition in which a supporting substrate is coated with a hard coating layer has been proposed to achieve a composition having high-hardness and wear resistance.

As a method of improving surface hardness of a hard coating layer, a method in which the thickness of a hard coating layer increases can be considered. In order to ensure enough surface hardness to substitute for glass, it is necessary to realize a constant thickness of a hard coating layer.

As the thickness of a hard coating layer increases, surface hardness may increase. However, wrinkling or curling increases due to cure shrinkage of a hard coating layer and simultaneously a hard coating layer is likely to be cracked or peeled off. Therefore, it is not easy to practically apply the method.

Recently, several methods for realizing high-hardness of a hard coating film and simultaneously solving a problem of cracking of a hard coating layer or a curl caused by cure shrinkage have been proposed.

In Korean Patent Publication No. 2014-0027022, a hard coating composition that includes an acrylate monomer and a photocurable elastomer having elongation in a predetermined range and thus exhibits improved impact resistance is disclosed. However, the hard coating composition disclosed above does not exhibit enough bending resistance and impact resistance to substitute for a glass panel of a display.

In Korean Patent Publication No. 2011-0078783, a hard coating composition that includes 5 to 80 wt % of an alkylene-glycol-based acrylic monomer and thus exhibits improved surface hardness and impact resistance is disclosed. However, the hard coating composition disclosed above also does not exhibit enough impact resistance to substitute for a glass panel of a display.

PRIOR-ART DOCUMENTS

Patent Documents

Korean Patent Publication No. 2014-0027022 (Mar. 6, 2014; LG Chem Ltd.)

Korean Patent Publication No. 2011-0078783 (Jul. 7, 2011; Cheil Industries Inc.)

SUMMARY OF THE INVENTION

The present invention is directed to providing a hard coating film which can exhibit excellent impact resistance and bending resistance and minimize the occurrence of a curl, and an image display device using the same.

In order to accomplish the above objectives, the present invention provides a hard coating film which is formed on a transparent substrate and includes a cured product of a hard coating composition including a high elongation oligomer having an elastic modulus ranging from 10 to 3000 MPa and an elongation at break ranging from 30 to 150%.

In addition, in order to accomplish the above objectives, the present invention provides an image display device which includes the hard coating film.

A hard coating film according to the present invention includes a high elongation oligomer having an elastic modulus and elongation at break in a specific range, and thus it is possible to exhibit excellent impact resistance and bending resistance and minimize the occurrence of a curl caused by cure shrinkage of a hard coating film.

DETAILED DESCRIPTION

When a portion "includes" an element in the present invention, another element may be further included, rather than excluding the presence of the other element, unless otherwise described.

Hereinafter, the present invention will be described in detail with reference to exemplary embodiments.

Hard Coating Film

A hard coating film according to an embodiment of the present invention is formed on a transparent substrate and includes a cured product of a hard coating composition including a high elongation oligomer having an elastic modulus ranging from 10 to 3000 MPa and an elongation at break ranging from 30 to 150%. When the hard coating composition has an elastic modulus and elongation at break in these ranges, it is possible to exhibit excellent bending resistance and impact resistance and minimize the occurrence of a curl.

The cured product of the hard coating composition has a thickness ranging from 50 to 300 μm. When the thickness of the cured product of the hard coating composition is less than 50 μm, impact resistance may be degraded. On the other hand, when the thickness thereof is greater than 300 μm, bending resistance may be degraded and a curl may occur.

High Elongation Oligomer

The hard coating film according to the present invention includes a high elongation oligomer.

The high elongation oligomer includes a photocurable (meth)acrylate oligomer.

The photocurable (meth)acrylate oligomer may include one or more selected from the group consisting of epoxy (meth)acrylate, urethane (meth)acrylate, and polyester (meth)acrylate.

The epoxy (meth)acrylate may be obtained by reacting a carboxylic acid having a (meth)acryloyl group with an epoxy compound. Specifically, the epoxy compound may be glycidyl (meth)acrylate, C1 to C12 linear alcohol-terminated glycidyl ether, diethylene glycol diglycidyl ether, tripropylene glycol diglycidyl ether, bisphenol A diglycidyl ether, ethylene oxide modified bisphenol A diglycidyl ether, propylene oxide modified bisphenol A diglycidyl ether, trimethylolpropane triglycidyl ether, pentaerythritol tetraglycidyl ether, hydrogenated bisphenol A diglycidyl ether, glycerin diglycidyl ether, or the like. The carboxylic acid having a (meth)acryloyl group may be (meth)acrylic acid, 2-(meth)acryloyloxyethyl succinic acid, 2-(meth)acryloyloxyethyl hexahydrophthalic acid, or the like.

The urethane (meth)acrylate may be prepared by reacting a multifunctional (meth)acrylate having a hydroxyl group in a molecule and a compound having an isocyanate group in the presence of a catalyst.

The (meth)acrylate having a hydroxyl group in a molecule may be one or more selected from the group consisting of 2-hydroxyethyl (meth)acrylate, 2-hydroxyisopropyl (meth)acrylate, 4-hydroxybutyl (meth)acrylate, caprolactone ring-opened hydroxyacrylate, a mixture of pentaerythritol tri- and tetra-(meth)acrylate, and a mixture of dipentaerythritol penta- and hexa-(meth)acrylate.

The compound having an isocyanate group in a molecule may be one or more selected from the group consisting of 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexene diisocyanate, 4,4'-methylenebis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis(2,6-dimethylphenyl isocyanate), 4,4'-oxybis(phenyl isocyanate), a trifunctional isocyanate derived from hexamethylene diisocyanate, and trimethane propanol adduct toluene diisocyanate.

The polyester (meth)acrylate may be, specifically, a diacrylate such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, 1,4-butanediol di(meth)acrylate, neopentyl glycol di(meth)acrylate, 1,6-hexanediol di(meth)acrylate, tricyclodecane di(meth)acrylate, bisphenol A di(meth)acrylate, and the like, trimethylolpropane tri(meth)acrylate, pentaerythritol tri(meth)acrylate, pentaerythritol tetra(meth)acrylate, ditrimethylolpropane tetra(meth)acrylate, dipentaerythritol penta(meth)acrylate, dipentaerythritol hexa(meth)acrylate, tris(2-(meth)acryloyloxyethyl)isocyanurate, or the like.

It is preferable that the urethane (meth)acrylate and the polyester (meth)acrylate be used in combination or both polyester and urethane groups be included in one molecule.

In particular, an acrylate oligomer having a linear structure may be used to form a hard coating film having an elongation of 30% or more, and a polyester (meth)acrylate having a linear structure and excellent flexibility is preferably used.

The high elongation oligomer may be included at 1 to 90 wt %, preferably, 5 to 80 wt % with respect to 100 wt % of the entire hard coating composition. When a content of the high elongation oligomer is less than 1 wt %, it is difficult to form a coated film or to manufacture a hard coating film having a sufficient level of impact resistance even when a coated film is formed. On the other hand, when a content thereof is greater than 90 wt %, uniformity of a coated film may be degraded due to high viscosity during the manufacture of a hard coating film.

In one exemplary embodiment of the present invention, the hard coating composition may further include one or more selected from the group consisting of a solvent, a photoinitiator, and an additive.

Solvent

The solvent is a material that may dissolve or disperse the above-described composition and may be used without limitation as long as a material is known as a solvent of a hard coating composition in the art.

Specifically, the solvent may preferably be alcohols (e.g., methanol, ethanol, isopropanol, butanol, methyl cellosolve, ethyl cellosolve, and the like), ketones (e.g., methyl ethyl ketone, methyl butyl ketone, methyl isobutyl ketone, diethyl ketone, dipropyl ketone, cyclohexanone, and the like), acetates (e.g., ethyl acetate, propyl acetate, n-butyl acetate, t-butyl acetate, methyl cellosolve acetate, ethyl cellosolve acetate, propylene glycol monomethyl ether acetate, propylene glycol monoethyl ether acetate, propylene glycol monopropyl ether acetate, methoxybutyl acetate, methoxypentyl acetate, and the like), alkanes (e.g., hexane, heptane, octane, and the like), benzene or derivatives thereof (e.g., benzene, toluene, xylene, and the like), ethers (e.g., diethylene glycol dimethyl ether, diethylene glycol diethyl ether, diethylene glycol dipropyl ether, diethylene glycol dibutyl ether, propylene glycol monomethyl ether, and the like), or the like. The solvents may be used alone or in combination of two or more.

The solvent may be included at 10 to 95 wt % with respect to 100 wt % of the entire hard coating composition. When a content of the solvent is less than 10 wt %, not only workability may be degraded by an increase in viscosity but also the swelling of a transparent substrate on which the hard coating composition is applied may not be sufficiently performed. On the other hand, when a content thereof is greater than 95 wt %, a drying process may take a long time and economic feasibility may decrease.

Photoinitiator

The photoinitiator may be used without limitation as long as a material is used in the art, and may be one or more selected from the group consisting of hydroxy ketones, amino ketones, and a hydrogen-abstraction-type photoinitiator.

Specifically, the photoinitiator may be 2-methyl-1-[4-(methylthio)phenyl]2-morpholine propanone-1, diphenyl ketone, benzyl dimethyl ketal, 2-hydroxy-2-methyl-1-phenyl-1-one, 4-hydroxy cyclophenyl ketone, 2,2-dimethoxy-2-phenyl-acetophenone, anthraquinone, fluorene, triphenylamine, carbazole, 3-methylacetophenone, 4-chloroacetophenone, 4,4-dimethoxyacetophenone, 4,4-diaminobenzophenone, 1-hydroxycyclohexyl phenyl ketone, benzophenone, diphenyl(2,4,6-trimethylbenzoyl)phosphine oxide, or the like. The photoinitiator may be used alone or in combination of two or more.

The photoinitiator may be included at 0.1 to 10 wt %, preferably, 1 to 5 wt % with respect to 100 wt % of the entire hard coating composition. When a content of the photoinitiator is less than 0.1 wt %, the curing speed of the hard coating composition decreases, insufficient curing occurs, and thus mechanical properties may be degraded. On the other hand, when a content thereof is greater than 10 wt %, a coated film may be cracked due to overcuring.

Additive

The additive may include one or more selected from the group consisting of an inorganic nanoparticle, a leveling agent, and a stabilizer.

(1) Inorganic Nanoparticle

The inorganic nanoparticles may be selectively added to improve hardness of a hard coating film. Specifically, when the inorganic nanoparticles are included in the hard coating composition, it is possible to further improve mechanical properties. More specifically, the inorganic nanoparticles are uniformly formed in a coated film and thus it is possible to improve mechanical properties such as wear resistance, scratch resistance, pencil hardness, and the like.

The inorganic nanoparticle may have an average diameter ranging from 1 to 100 nm, particularly 1 to 80 nm, and more particularly 5 to 50 nm. When an average diameter of the inorganic nanoparticle is within these ranges, it is possible to prevent a phenomenon in which agglomeration occurs in a composition and thus form a uniform coated film and prevent a decrease in optical characteristics and mechanical properties of a coated film.

The inorganic nanoparticle may include one or more selected from the group consisting of $Al_2O_3$, $SiO_2$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO, MgO, and a combination thereof, but the present invention is not limited thereto. The inorganic nanoparticle may include a metal oxide commonly used in the art.

Specifically, the inorganic nanoparticle may be $Al_2O_3$, $SiO_2$, or $ZrO_2$. The inorganic nanoparticle may be directly manufactured or may be a commercially available product in which the inorganic nanoparticles are dispersed in an organic solvent at a concentration ranging from 10 to 80 wt %.

(2) Leveling Agent

The leveling agent may include one or more selected from the group consisting of a silicone-based leveling agent, a fluorine-based leveling agent, and an acrylic leveling agent. When the leveling agent is included in the hard coating composition, it is possible to provide smoothness and coatability during the formation of a coated film.

Specifically, the leveling agent may be BYK-323, BYK-331, BYK-333, BYK-337, BYK-373, BYK-375, BYK-377, or BYK-378, all of which are commercially available from BYK Chemie GmbH, TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300, TEGO Rad 2500, all of which are commercially available from Evonik TEGO Chemie GmbH, FC-4430, FC-4432, all of which are commercially available from 3M, or the like, but the present invention is not limited thereto. A leveling agent commonly used in the art may be used.

(3) Stabilizer

The stabilizer may include one or more selected from the group consisting of hindered amine; phenyl salicylate; benzophenone; benzotriazole; nickel derivative; radical scavenger; polyphenol; phosphite; and lactone stabilizers.

The term "UV stabilizer" used herein refers to an additive that is added for the purpose of protecting an adhesive by blocking or absorbing UV rays because the cured surface of a coated film is discolored and easily broken due to decomposition caused by continuous UV ray exposure.

The UV stabilizer may be classified as an absorbent, a quencher, or a hindered amine light stabilizer (HALS) based on a mechanism. Also, the UV stabilizer may be classified as phenyl salicylate (absorbent), benzophenone (absorbent), benzotriazole (absorbent), a nickel derivative (quencher), or a radical scavenger based on a chemical structure.

However, the present invention is not limited thereto as long as an UV stabilizer does not significantly change the initial color of an adhesive.

As a heat stabilizer which is a commercially applicable product, polyphenols (a primary heat stabilizer) and phosphites and lactones (a secondary heat stabilizer) may be used alone or in combination thereof. The UV stabilizer and the heat stabilizer may be used by appropriately adjusting a content thereof at a level at which an UV curing property is not affected.

Transparent Substrate

The hard coating film according to the present invention is formed by applying the above-described hard coating composition on one surface of a transparent substrate and then curing the composition.

The term "transparency" used herein means that the transmittance of visible rays is 70% or more or 80% or more.

The transparent substrate may be any polymer film having transparency.

Specifically, the transparent substrate may be a film made of a polymer such as a cycloolefin derivative having a cycloolefin-containing monomer such as a norbornene or polycyclic norbornene-based monomer, cellulose (e.g., diacetyl cellulose, triacetyl cellulose, acetyl cellulose butylate, isobutyl ester cellulose, propionyl cellulose, butyryl cellulose, or acetylpropionyl cellulose), an ethylene/vinyl acetate copolymer, polycycloolefins, polyester, polystyrene, polyamide, polyetherimide, polyacryl, polyimide, polysulfone, polyethylene, polypropylene, polymethylpentene, polyvinyl chloride, polyvinylidene chloride, polyvinyl alcohol, polyvinyl acetal, polyetherketone, polyether ether ketone, polyethersulfone, polymethyl methacrylate, polyethylene terephthalate, polybutylene terephthalate, polyethylene naphthalate, polycarbonate, polyurethane, epoxy, and the like, and may also be an unoriented film or a uniaxially or biaxially oriented film. These polymers may be used alone or in combination of two or more.

Among the above-described transparent substrates, a polyimide film or a uniaxially or biaxially oriented polyester film, which exhibit excellent transparency and heat resistance, a cycloolefin derivative film or a polymethyl methacrylate film, which exhibit excellent transparency and heat resistance and are capable of supporting a large-sized film, or triacetyl cellulose or isobutylester cellulose films, which exhibit transparency and do not have optical anisotropy, may be preferably used.

The hard coating film according to the present invention may be a film for a flexible display. Specifically, the hard coating film may be used as a functional layer or a substitute for a cover glass of a display such as a LCD, an OLED, a LED, a FED and the like, a touch panel of various mobile communication terminals, a smart phone, or a tablet PC using the display, electronic paper, or the like.

The present invention provides a window which includes the hard coating film.

In addition, the present invention provides a flexible image display device which includes the window.

EXEMPLIFICATION

Hereinafter, preferred embodiments of the present invention will be described in order to aid in understanding the present invention. However, it is apparent to those skilled in the art that the description proposed herein is just a preferable example for the purpose of illustration only, and is not intended to limit or define the scope of the invention. Therefore, it should be understood that various changes and modifications can be made to the exemplary embodiments of the present invention without departing from the scope of the present invention, so that the present invention covers all such changes and modifications provided and they are within the scope of the appended claims and their equivalents. Hereinafter, all "percentage(s)" and "part(s)" representing the content in Examples and Comparative Examples are by weight unless otherwise specified.

Preparation Examples 1 to 7: Preparation of Hard Coating Composition

Preparation Example 1

70 parts by weight of urethane acrylate (UA-122P commercially available from Shin-Nakamura Chemical Co., Ltd.), 25 parts by weight of methyl ethyl ketone, 4.5 parts by weight of a photoinitiator (1-hydroxy-cyclohexyl-phenyl-ketone), and 0.5 parts by weight of a leveling agent (BYK-3570 commercially available from BYK Chemie GmbH) were mixed using a stirrer and filtered using a filter made of a polypropylene (PP) material to prepare a hard coating composition. Here, the urethane acrylate had an elastic modulus of 2070 MPa and an elongation at break of 58%.

Preparation Example 2

70 parts by weight of urethane acrylate (UA-232P commercially available from Shin-Nakamura Chemical Co., Ltd.), 25 parts by weight of methyl ethyl ketone, 4.5 parts by weight of a photoinitiator (1-hydroxy-cyclohexyl-phenyl-ketone), and 0.5 parts by weight of a leveling agent (BYK-3570 commercially available from BYK Chemie GmbH) were mixed using a stirrer and filtered using a filter made of a polypropylene (PP) material to prepare a hard coating composition. Here, the urethane acrylate had an elastic modulus of 1320 MPa and an elongation at break of 135%.

Preparation Example 3

70 parts by weight of urethane acrylate (UA-122P commercially available from Shin-Nakamura Chemical Co., Ltd.), 25 parts by weight of methyl ethyl ketone, 4.5 parts by weight of a photoinitiator (1-hydroxy-cyclohexyl-phenyl-ketone), and 0.5 parts by weight of a leveling agent (BYK-3570 commercially available from BYK Chemie GmbH) were mixed using a stirrer and filtered using a filter made of a polypropylene (PP) material to prepare a hard coating composition. Here, the urethane acrylate had an elastic modulus of 2570 MPa and an elongation at break of 67%.

Preparation Example 4

50 parts by weight of urethane acrylate (UA-122P commercially available from Shin-Nakamura Chemical Co., Ltd.), 20 parts by weight of pentaerythritol triacrylate, 25 parts by weight of methyl ethyl ketone, 4.5 parts by weight of a photoinitiator (1-hydroxy-cyclohexyl-phenyl-ketone), and 0.5 parts by weight of a leveling agent (BYK-3570 commercially available from BYK Chemie GmbH) were mixed using a stirrer and filtered using a filter made of a polypropylene (PP) material to prepare a hard coating composition. Here, a mixture of the urethane acrylate and pentaerythritol triacrylate had an elastic modulus of 3220 MPa and an elongation at break of 12%.

Preparation Example 5

35 parts by weight of urethane acrylate (UA-122P commercially available from Shin-Nakamura Chemical Co., Ltd.), 35 parts by weight of pentaerythritol triacrylate, 25 parts by weight of methyl ethyl ketone, 4.5 parts by weight of a photoinitiator (1-hydroxy-cyclohexyl-phenyl-ketone), and 0.5 parts by weight of a leveling agent (BYK-3570 commercially available from BYK Chemie GmbH) were mixed using a stirrer and filtered using a filter made of a polypropylene (PP) material to prepare a hard coating composition. Here, a mixture of the urethane acrylate and pentaerythritol triacrylate had an elastic modulus of 3705 MPa and an elongation at break of 7%.

Preparation Example 6

20 parts by weight of urethane acrylate (UA-122P commercially available from Shin-Nakamura Chemical Co., Ltd.), 50 parts by weight of pentaerythritol triacrylate, 25 parts by weight of methyl ethyl ketone, 4.5 parts by weight of a photoinitiator (1-hydroxy-cyclohexyl-phenyl-ketone), and 0.5 parts by weight of a leveling agent (BYK-3570 commercially available from BYK Chemie GmbH) were mixed using a stirrer and filtered using a filter made of a polypropylene (PP) material to prepare a hard coating composition. Here, a mixture of the urethane acrylate and pentaerythritol triacrylate had an elastic modulus of 4210 MPa and an elongation at break of 5%.

Preparation Example 7

35 parts by weight of urethane acrylate (UA-122P commercially available from Shin-Nakamura Chemical Co., Ltd.), 35 parts by weight of dipentaerythritol hexaacrylate, 25 parts by weight of methyl ethyl ketone, 4.5 parts by weight of a photoinitiator (1-hydroxy-cyclohexyl-phenyl-ketone), and 0.5 parts by weight of a leveling agent (BYK-3570 commercially available from BYK Chemie GmbH) were mixed using a stirrer and filtered using a filter made of a polypropylene (PP) material to prepare a hard coating composition. Here, a mixture of the urethane acrylate and dipentaerythritol hexaacrylate had an elastic modulus of 4570 MPa and an elongation at break of 3%.

Examples 1 to 7 and Comparative Examples 1 to 4: Manufacture of Hard Coating Film Example 1

The hard coating composition prepared in Preparation Example 1 was applied on a polyimide film having a thickness of 80 μm in such a way that the composition has a thickness of 200 μm after curing. After coating the film, the solvent was dried and UV rays were radiated at an integrated light intensity of 500 mJ/cm$^2$ for curing the composition to manufacture a hard coating film.

Example 2

A hard coating film was manufactured in the same manner as in Example 1 except that the hard coating composition prepared in Preparation Example 2 was used.

Example 3

A hard coating film was manufactured in the same manner as in Example 1 except that the hard coating composition prepared in Preparation Example 3 was used.

Example 4

A hard coating film was manufactured in the same manner as in Example 1 except that a hard coating layer had a thickness of 70 μm after curing.

Example 5

A hard coating film was manufactured in the same manner as in Example 1 except that a hard coating layer had a thickness of 250 μm after curing.

Example 6

A hard coating film was manufactured in the same manner as in Example 1 except that a hard coating layer had a thickness of 20 μm after curing.

Example 7

A hard coating film was manufactured in the same manner as in Example 1 except that a hard coating layer had a thickness of 500 μm after curing.

Comparative Example 1

A hard coating film was manufactured in the same manner as in Example 1 except that the hard coating composition prepared in Preparation Example 4 was used.

Comparative Example 2

A hard coating film was manufactured in the same manner as in Example 1 except that the hard coating composition prepared in Preparation Example 5 was used.

Comparative Example 3

A hard coating film was manufactured in the same manner as in Example 1 except that the hard coating composition prepared in Preparation Example 6 was used.

Comparative Example 4

A hard coating film was manufactured in the same manner as in Example 1 except that the hard coating composition prepared in Preparation Example 7 was used.

Experimental Example

Properties of the hard coating films prepared in Examples 1 to 7 and Comparative Examples 1 to 4 were measured in the following manner, results of which are shown in Table 1. A measurement method and an evaluation method used in the present invention are as follows.

(1) Bending Resistance

A hard coating layer of a hard coating film is directed to face inward, and a hard coating film was folded in half to have an interval of 6 mm between surfaces thereof. Afterward, whether or not a folded portion was cracked when the film was unfolded again was observed by the naked eye and determined, results of which are shown in the following Table 1.

Good: no cracking at folded portion

Failure: cracking at folded portion (2) Impact Resistance

The opposite surface of a hard coating layer of a hard coating film, that is, a transparent substrate layer, was adhered to glass using a 50 μm optically clear adhesive (OCA) (elastic modulus of 0.08 MPa). Afterward, the maximum weight of the steel ball that did not break the glass of a lower portion of a hard coating film when a steel ball was freely dropped on the surface of a hard coating layer from a height of 50 cm was measured, results of which are shown in the following Table 1.

(3) Curl

A hard coating film was cut to a size of 10 cm×10 cm and maintained under conditions of 25° C. and 48 RH % for 24 hours. Afterward, a degree at which each edge was lifted from the bottom was evaluated, results of which are shown in the following Table 1.

⊚: an average height of four edges is 20 mm or less

O: an average height of four edges is 50 mm or less

Δ: an average height of four edges is greater than 50 mm

X: four edges are completely lifted and thus a film is rolled up in a cylindrical form

TABLE 1

| | Bending resistance | Impact resistance | Curl |
|---|---|---|---|
| Example 1 | Good | 40 g | ⊚ |
| Example 2 | Good | 55 g | ⊚ |
| Example 3 | Good | 45 g | ⊚ |
| Example 4 | Good | 40 g | ⊚ |
| Example 5 | Good | ≥65 g | ⊚ |
| Example 6 | Good | 30 g | ⊚ |
| Example 7 | Failure | ≥65 g | O |
| Comparative Example 1 | Good | 20 g | O |
| Comparative Example 2 | Failure | 10 g | X |
| Comparative Example 3 | Failure | 5 g | X |
| Comparative Example 4 | Failure | 5 g | X |

Referring to Table 1, it can be seen that hard coating films according to Examples 1 to 7 of the present invention having elastic moduli and elongations at break within the above-described ranges exhibit excellent bending resistance, impact resistance and a decrease in the occurrence of a curl compared to hard coating films according to Comparative Examples 1 to 4 having elastic moduli and elongations at break outside the above-described ranges.

In addition, it can be seen that hard coating films according to Examples 1 to 5 having a thickness ranging from 50 to 300 μm after a hard coating composition was cured exhibit more excellent bending resistance, impact resistance and a decrease in the occurrence of a curl compared to hard coating films according to Examples 6 to 7 having a thickness outside the above-described range.

What is claimed is:

1. A hard coating film formed on a transparent substrate and consisting of one hard coating layer, wherein the hard coating layer comprises a cured product of a hard coating composition including a high elongation oligomer having an elastic modulus ranging from 10 to 3000 MPa and an elongation at break ranging from 30 to 150%, wherein the high elongation oligomer comprises urethane (meth)acrylate, wherein polymers in the cured product of a hard coating composition are homopolymers of the high elongation oligomer, wherein the cured product of the hard coating composition has a thickness ranging from 50 to 300 μm.

2. The hard coating film according to claim 1, wherein the hard coating composition further comprises a solvent, a photoinitiator, an additive, or a combination thereof.

3. The hard coating film according to claim 1, wherein the high elongation oligomer comprises 1 to 90 wt % of the entire hard coating composition.

4. A window comprising the hard coating film according to claim 1.

5. A flexible image display device comprising the window according to claim 4.

\* \* \* \* \*